US 9,977,813 B2

(12) United States Patent
Tatsumi et al.

(10) Patent No.: US 9,977,813 B2
(45) Date of Patent: May 22, 2018

(54) STORAGE DEVICE AND DATA MIGRATION METHOD

(71) Applicant: Hitachi, Ltd., Tokyo (JP)

(72) Inventors: Ryosuke Tatsumi, Tokyo (JP); Tadato Nishina, Tokyo (JP); Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 14/651,688

(22) PCT Filed: Jan. 17, 2013

(86) PCT No.: PCT/JP2013/050761
§ 371 (c)(1),
(2) Date: Jun. 12, 2015

(87) PCT Pub. No.: WO2014/112062
PCT Pub. Date: Jul. 24, 2014

(65) Prior Publication Data
US 2015/0324418 A1    Nov. 12, 2015

(51) Int. Cl.
*G06F 17/30* (2006.01)
*G06F 3/06* (2006.01)

(52) U.S. Cl.
CPC ........ *G06F 17/30371* (2013.01); *G06F 3/067* (2013.01); *G06F 3/0608* (2013.01);
(Continued)

(58) Field of Classification Search
CPC ......... G06F 17/30371; G06F 17/30876; G06F 17/30368; G06F 17/30; G06F 3/06;
(Continued)

(56) References Cited

U.S. PATENT DOCUMENTS 5,592,630 A * 1/1997 Yamagami .......... G06F 12/0866
710/52
6,668,264 B1 * 12/2003 Patterson ............ G06F 11/1471
707/E17.007

(Continued)

FOREIGN PATENT DOCUMENTS

JP    2006-338461 A    12/2006
JP    2007-272675 A    10/2007

(Continued)

OTHER PUBLICATIONS

International Search Report of PCT/JP2013/050761.
Japanese Office Action received in corresponding Japanese Application No. 2014-557234 dated Dec. 6, 2016.

*Primary Examiner* — Anh Ly
(74) *Attorney, Agent, or Firm* — Mattingly & Malur, PC

(57) ABSTRACT

As a method for migrating data of a volume adopting a snapshot function to a new storage system, in order to perform migration without depending on a method for compressing snapshot data of a migration source storage system, and without stopping transmission and reception of data between the host computer and the storage system, at first, after migrating data of a volume being the source of snapshot (PVOL), migration is performed sequentially from newer generations. At this time, migration target data of each SVOL is all the data within the migration source storage system. The SVOL data copied to a migration destination storage is compared with one-generation-newer SVOL data within the migration destination storage system, and based on the comparison result, a difference management information is created. If there is difference, a VOL allocation management table is updated, and difference data is stored in the area allocated within the pool.

13 Claims, 17 Drawing Sheets

(52) U.S. Cl.
CPC ...... *G06F 3/0647* (2013.01); *G06F 17/30368* (2013.01); *G06F 17/30876* (2013.01)

(58) Field of Classification Search
CPC ...... G06F 3/067; G06F 3/0608; G06F 3/0647; G06F 3/065; G06F 3/0613; G06F 11/20; G06F 11/2069; G06F 17/30867; H04L 67/1095; H04L 67/1097
See application file for complete search history.

(56) References Cited

U.S. PATENT DOCUMENTS

| | | | | |
|---|---|---|---|---|
| 7,124,267 | B2* | 10/2006 | Morishita | G06F 3/061 711/111 |
| 8,108,640 | B1* | 1/2012 | Holl, II | G06F 11/1458 711/162 |
| 8,326,798 | B1* | 12/2012 | Driscoll | G06F 17/30082 707/610 |
| 8,655,848 | B1* | 2/2014 | Leverett | G06F 17/30088 707/660 |
| 2004/0193802 | A1* | 9/2004 | Meiri | G06F 12/0868 711/118 |
| 2004/0193816 | A1* | 9/2004 | Meiri | G06F 12/0868 711/162 |
| 2005/0223170 | A1* | 10/2005 | Ushijima | G06F 11/1448 711/114 |
| 2006/0107010 | A1* | 5/2006 | Hirezaki | G06F 3/061 711/165 |
| 2006/0277226 | A1 | 12/2006 | Chikusa et al. | |
| 2007/0067593 | A1* | 3/2007 | Satoyama | G06F 3/0613 711/165 |
| 2007/0124317 | A1* | 5/2007 | Dettinger | G06F 17/30501 707/999.1 |
| 2007/0198694 | A1* | 8/2007 | Nishino | A63F 13/12 709/224 |
| 2007/0220071 | A1* | 9/2007 | Anzai | G06F 3/0619 707/E17.005 |
| 2007/0294495 | A1* | 12/2007 | Uchida | G06F 11/1451 711/162 |
| 2009/0055593 | A1 | 2/2009 | Satoyama et al. | |
| 2009/0113153 | A1* | 4/2009 | Yamamoto | G06F 11/1451 711/162 |
| 2009/0193206 | A1* | 7/2009 | Ishii | G06F 3/0607 711/162 |
| 2010/0030959 | A1* | 2/2010 | Satoyama | G06F 11/1435 711/112 |
| 2010/0058011 | A1* | 3/2010 | Satoyama | G06F 11/1458 711/162 |
| 2010/0088280 | A1* | 4/2010 | Satoyama | G06F 11/1471 707/640 |
| 2011/0029748 | A1* | 2/2011 | Nakamura | G06F 11/1451 711/162 |
| 2011/0071983 | A1* | 3/2011 | Murase | G06F 9/5088 707/649 |
| 2011/0178988 | A1* | 7/2011 | Satoyama | G06F 3/0608 707/649 |
| 2012/0011336 | A1* | 1/2012 | Saika | G06F 3/0604 711/162 |
| 2013/0179550 | A1* | 7/2013 | Kakizaki | G06F 15/177 709/221 |
| 2013/0246724 | A1* | 9/2013 | Furuya | G06F 3/0655 711/162 |
| 2017/0163728 | A1* | 6/2017 | Chawla | G06F 3/0619 711/112 |

FOREIGN PATENT DOCUMENTS

| | | |
|---|---|---|
| JP | 2009-48497 A | 3/2009 |
| JP | 2009-181206 A | 8/2009 |
| JP | 2012-014286 A | 1/2012 |

\* cited by examiner

FIG. 7

| PVOL Number | Slot Number | First Generation SVOL | Second Generation SVOL | ... | n-th Generation SVOL |
|---|---|---|---|---|---|
| 0002 | 0001 | Difference Exists | No Difference | ... | No Difference |
| 0002 | 0002 | No Difference | No Difference | ... | No Difference |
| 0002 | 0003 | No Difference | Difference Exists | ... | Difference Exists |

| VOL Number | Slot Number | Presence of Allocation | Pool Number | Slot Number within Pool |
|---|---|---|---|---|
| 0003 | 0001 | Allocated | 0001 | 0004 |
| 0003 | 0002 | Not Allocated | — | — |
| 0003 | 0003 | Not Allocated | — | — |
| 0004 | 0001 | | | |
| 0004 | 0002 | | | |
| 0004 | 0003 | | | |

| VOL Number | Migration Status | VOL Last Slot Number | Migration Complete Slot Number |
|---|---|---|---|
| 0001 | Complete | 10000 | 10000 |
| 0002 | Complete | 10000 | 10000 |
| 0003 | Migrating | 10000 | 5000 |
| 0004 | Before Migration | 10000 | 0 |
| 0005 | Before Migration | 10000 | 0 |

| PVOL Number | Slot Number | First Generation SVOL | Second Generation SVOL | ... | n-th Generation SVOL |
|---|---|---|---|---|---|
| 0002 | 0001 | n-th Generation SVOL | Not shared | | Not shared |
| 0002 | 0002 | PVOL | PVOL | | PVOL |
| 0002 | 0003 | PVOL | Not shared | | PVOL |

422B 4220 4221 4222

STORAGE DEVICE AND DATA MIGRATION METHOD

TECHNICAL FIELD

The present invention relates to a method for migrating a storage system having a snapshot function, and specifically, relates to a method for migrating a snapshot to another storage system from a storage system not having a function to output difference management information of snapshot data allocation management information.

BACKGROUND ART

A snapshot function of a storage system is a function to retain data of a volume of a certain point of time in the past. The volume being the source of the snapshot is called a PVOL (Primary Volume), and the volume retaining past data is called a SVOL (Secondary Volume). For efficiency of capacity, each SVOL has only the actual data of PVOL or an SVOL acquired newly than itself and the difference data therefrom stored in the pool. The storage system refers to a difference management information and a VOL allocation management information, and specifies the storage position of SVOL data.

When a snapshot function is adopted in a migration source volume of a migration source storage system, it is desirable that the processing of the snapshot function is continued in the migration destination storage system.

According to an example for migrating data being subjected to snapshot management, a PVOL, an SVOL and a pool are prepared in the migration destination storage system, and SVOL data of the oldest generation (first generation) is copied from the migration source storage to the PVOL of the migration destination storage. Next, the difference management information between the first generation SVOL and an SVOL of the second oldest generation (second generation) and the VOL allocation management information are referred to in the migration source storage system, and only the data having difference out of all the second generation SVOL data are transferred to the PVOL of the migration destination storage. The transferred data is written into the PVOL of the migration destination storage, and the first generation SVOL is restored by the snapshot function of the migration destination storage system. A technique of migrating a snapshot function is provided (refer for example to patent literature 1) in which the above-described process is repeatedly performed to restore the snapshot of the migration source storage system.

CITATION LIST

Patent Literature

[PTL 1] Japanese Patent Application Laid-Open Publication No. 2009-181206 (United States Patent Application Publication No. U.S. 2009/0193206)

SUMMARY OF INVENTION

Technical Problem

According to the art disclosed in patent literature 1, the difference management information and the VOL allocation management information are management information within the storage system. Therefore, a generation storage system does not have a function to output the information to an external system. Further, since the information depends on the types of the storage system and the snapshot function, the copied management information may not be used as it is in the migration destination storage system.

Therefore, the present invention aims at realizing migration of a snapshot function that does not require any special function for transferring data having difference to the migration destination storage system.

Solution to Problem

Therefore, according to the present invention, after migrating PVOL data, the data of SVOLs are migrated sequentially starting from the newest generation. At this time, the migration target data of each SVOL is all data, regardless of the difference management information stored in the migration source storage system. The data of an SVOL of a certain generation copied to the migration destination storage is compared with the SVOL data of the SVOL data that is one generation newer in the migration destination storage system, and based on the comparison result, the difference information with respect to the one-generation-newer SVOL data is created. If there is difference, the VOL allocation management pool is updated, and the difference information is stored in an area allocated within the pool.

Advantageous Effects of Invention

The present invention enables a volume adopting a snapshot function to be migrated to a new storage system without requiring any special function in existing devices such as a host computer, a migration source storage system or a network device, regardless of how snapshot data is stored in the migration source storage system, and without stopping the transmission and reception of data between the host computer and the storage system.

BRIEF DESCRIPTION OF DRAWINGS

FIG. 7 is a conceptual diagram showing a data configuration of a snapshot data management table.

FIG. 8 is a conceptual diagram showing the data configuration of a VOL allocation management table.

FIG. 9 is a conceptual diagram showing the data configuration of a migration management table.

FIG. 17 is a conceptual diagram showing a data configuration of a snapshot data management table according to embodiment 3.

DESCRIPTION OF EMBODIMENTS

Now, before describing the respective embodiments according to the present invention, the system configuration according to the present invention common in all embodiments will be described with reference to FIG. 1.
<System Configuration>

Figure 1:
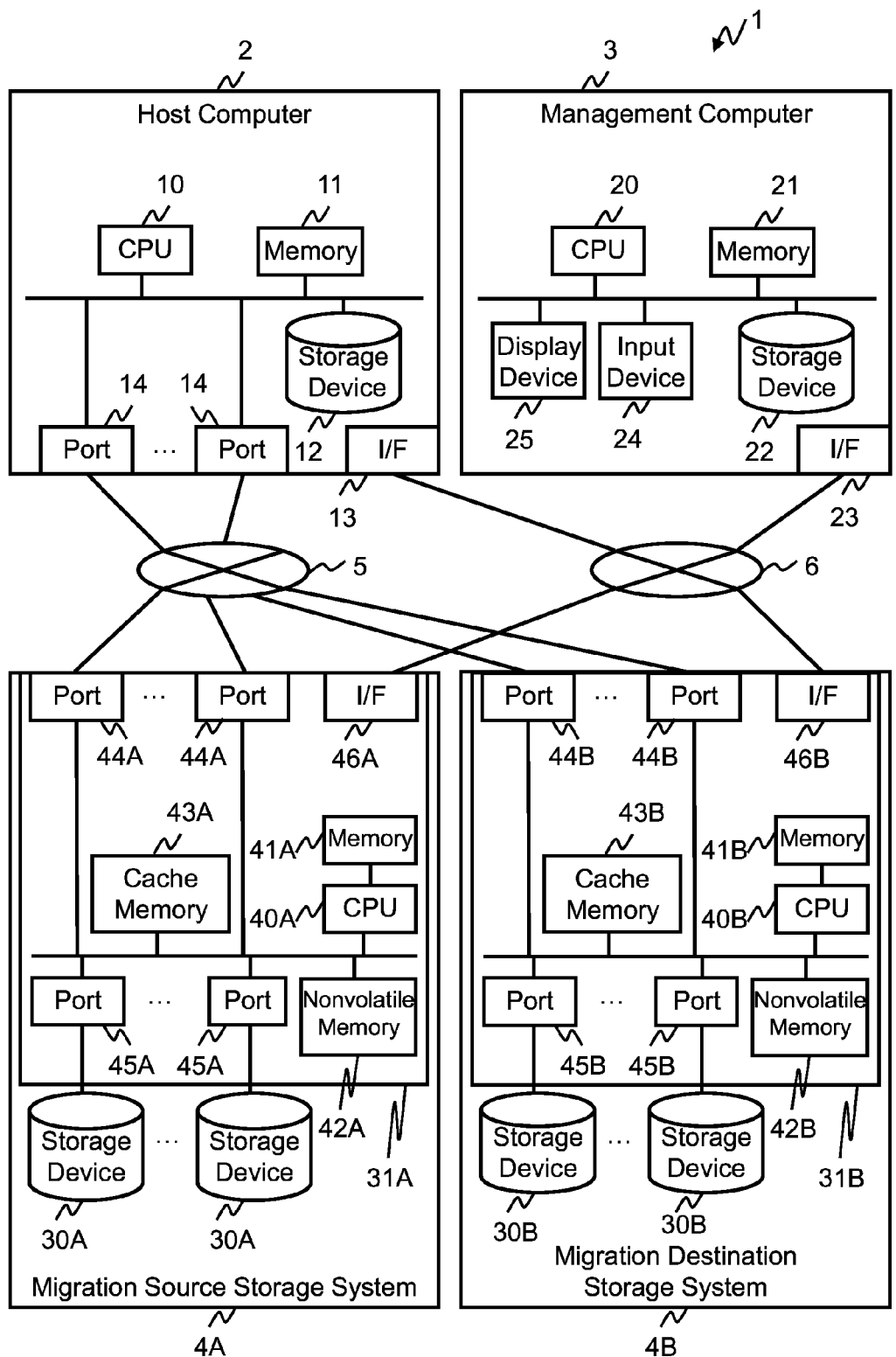
FIG. 1 is a block diagram of an overall computer system according to embodiments 1 through 3 of the present invention.

FIG. 1 is a block diagram of an overall computer system according to embodiments 1 through 3 of the present invention. The computer system 1 shown in FIG. 1 is a system configuration common to all the embodiments of the present invention as a whole. The present computer system 1 is composed of a host computer 2, a management computer 3, two storage systems 4A and 4B, a SAN (Storage Area Network) 5 and a LAN (Local Area Network) 6. The host computer 2 is coupled via the SAN 5 to respective storage systems 4A and 4B, and the management computer 3 is coupled via the LAN 6 to the host computer 2 and respective storage systems 4A and 4B.

The host computer 2 is composed of a CPU 10, a memory 11, a storage device 12, an interface control unit 13 and a plurality of ports 14. The CPU 10 is a processor for performing operation control of the whole host computer 2, and reads various programs stored in the storage device 12 to the memory 11 to execute the same. The memory 11 is used to store various programs read from the storage device 12 by the CPU 10 during starting of the host computer 2, and it is also used as a work memory of the CPU 10.

The storage device 12 is composed for example of an HDD (Hard Disk Drive) or an SSD (Solid State Drive), and used to store various programs and control data. The interface control unit 13 is an adapter for coupling the host computer 2 to the LAN 6, and the respective ports 14 are adapters for coupling the host computer 2 to the SAN 5.

The management computer 3 is a computer for managing the host computer 2 and the respective storage systems 4A and 4B, which is composed of a CPU 20, a memory 21, a storage device 22, an interface control unit 23, an input device 24 and a display device 25. The CPU 20 is a processor for performing operation control of the overall management computer 3, and reads the various programs stored in the storage device 22 to execute the same. The memory 21 is used to store various programs read from the storage device 22 via the CPU 20 during starting of the management computer 3, and also used as a work memory of the CPU 20.

The storage device 22 is composed for example of an HDD or an SSD, and used to store various programs and control data. The interface control unit 23 is an adapter for coupling the management computer 3 to the LAN 6. The input device 24 is composed of a keyboard and a mouse, for example, and the display device 25 is composed of a liquid crystal display, for example.

Storage systems 4A and 4B are composed of a plurality of storage devices 30A and 30B and control units 31A and 31B for controlling the input and output of data to and from the storage devices 30A and 30B. Hereafter, when A and B are attached to same reference numbers, they refer to components or functions within a migration source storage system 4A and a migration destination storage system 4B.

The storage devices 30A and 30B are composed for example of HDDs or SSDs. The plurality of storage devices 30A and 30B constitute a single RAID (Redundant Array of Inexpensive Disks) group, and one or more logical units are set within a storage area provided from one or more RAID groups. Then, the data from the host computer 2 is stored within the logical unit having a block of a given size set as a unit.

The control units 31A and 31B are composed of CPUs 40A and 40B, memories 41A and 41B, nonvolatile memories 42A and 42B, cache memories 43A and 43B, a plurality of host-side ports 44A and 44B, a plurality of storage device-side ports 45A and 45B, and interface control units 46A and 46B.

The CPUs 40A and 40Bb are processors for performing operation control of the overall storage systems 4A and 4B, which read the various programs stored in the nonvolatile memories 42A and 42B into memories 41A and 41B to execute the same. The memories 41A and 41B are used to store the various programs read from the nonvolatile memories 43A and 43B by the CPUs 40A and 40B during starting of the storage systems 4A and 4B, and also used as a work memory of CPUs 40A and 40B.

Nonvolatile memories 42A and 42B are used to store the various programs and control data. The cache memories 43A and 43B is used to mainly temporarily store the data sent and received between the host computer 2 and the storage devices 30A and 30B. The host-side ports 44A and 44B are adapters for coupling the storage systems 4A and 4B to the SAN 5, and the storage device-side ports 45A and 45B are adapters corresponding to the storage devices 30A and 30B. The interface control units 46A and 46B are adapters for coupling the storage systems 4A and 4B to the LAN 6.

In the present embodiment, the storage system 4A is a migration source of the migration target volume, and the storage system 4B is a migration destination of the migration target volume. Hereafter, these systems are respectively referred to as a migration source storage system 4A and a migration destination storage system 4B.

Embodiment 1

Figure 2A:
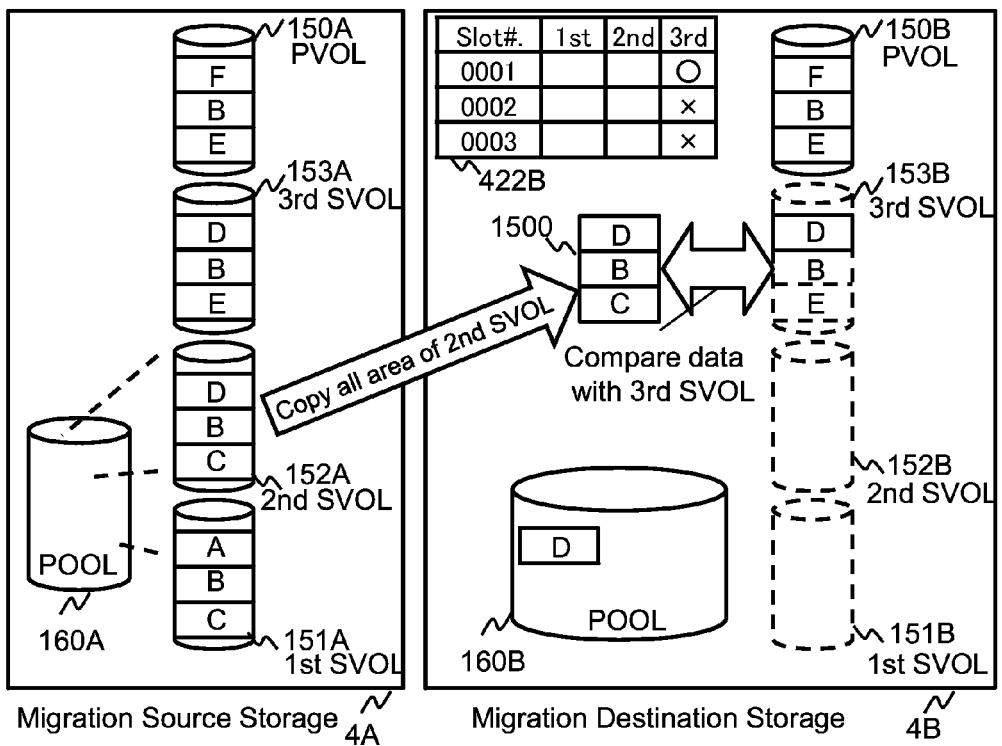
FIG. 2A is a block diagram illustrating a former half of a migration operation according to the outline of embodiment 1.
Figure 2B:
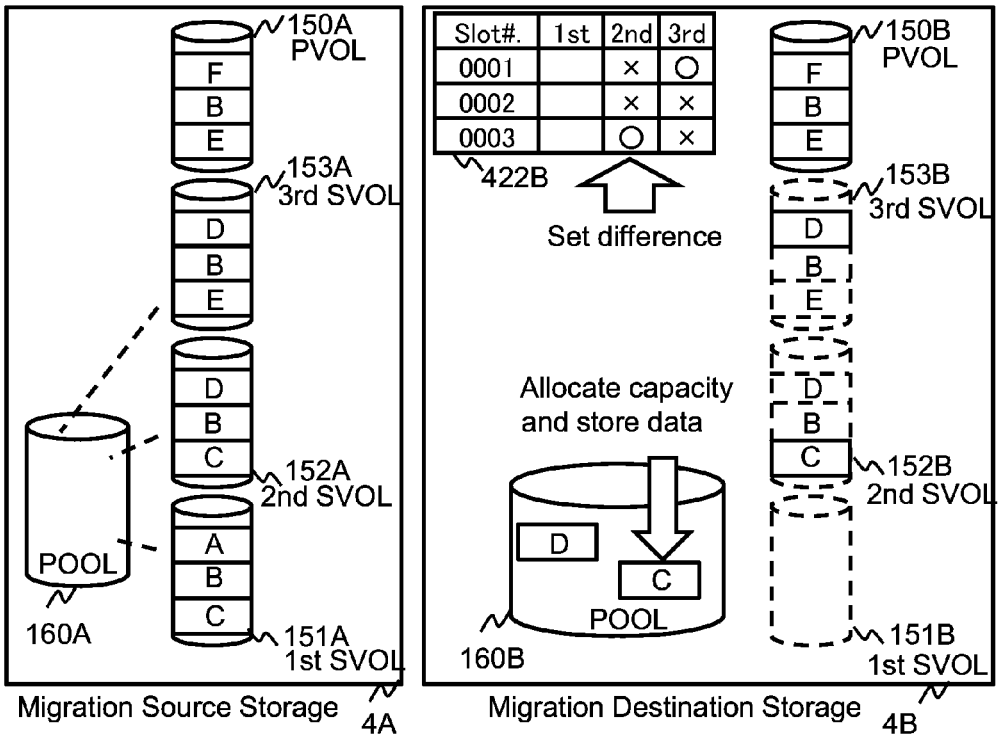
FIG. 2B is a block diagram illustrating a latter half of a migration operation according to the outline of embodiment 1.

FIGS. 2A and 2B are view showing the outline of the embodiment 1.

The CPUs 40A and 40B of FIG. 1 respectively provide storage areas of the storage devices 30A and 30B as a VOL and a pool.

A snapshot PVOL 150A being the migration target, a first generation SVOL 151A, a second generation SVOL 152A, a third generation SVOL 153A and a pool 160A for storing the data of these volumes exist within the migration source storage system 4A.

The PVOL 150A being the migration target, a PVOL 150B corresponding to the respective SVOLs 151A through 153A, a first generation SVOL 151B, a second generation SVOL 152B, a third generation SVOL 153B, a pool 260B storing the data of these volumes, an SVOL data 1500 copied from the migration source storage system 4A to the migration destination storage system 4B, and a snapshot data management table 422B described later exist within the migration destination storage system 4B.

Regarding the respective SVOLs, the first generation SVOLs 151A and 151B are the oldest, and the data becomes newer in the order of the second generation SVOL 152A and 152B, and the third generation SVOLs 153A and 153B. The PVOL and the respective SVOLs can receive I/O from the host computer 2 (FIG. 1).

FIG. 2A shows a former portion of the operation for migrating the second generation SVOL 152A of the migration source storage system 4A to the second generation SVOL 152B of the migration destination storage system 4B. At first, the data in the whole area of the second generation SVOL of the migration source storage system 4A is copied to the migration destination storage system 4B. Next, the data 1500 having been copied is compared with the data of the third generation SVOL 153B which is one generation newer than the second generation SVOL within the migration destination storage system 4B, and checks whether there are differences.

FIG. 2B shows a latter portion of the operation for migrating the second generation SVOL 152A of the migration source storage system 4A to the second generation SVOL 152B of the migration destination storage system 4B. Based on the above-described check on there are differences, whether there are differences in the respective slots are set in the snapshot data management table 422B ("2nd" row in FIG. 2B). The slot determined to have difference has a necessary capacity allocated from pool 160B to the second generation SVOL 152B, and the data of the corresponding slot of the data 1500 copied from the migration source storage system 4A ("data C" in FIG. 2B) is stored.

<2. Configuration of Various Data>

Figure 3:
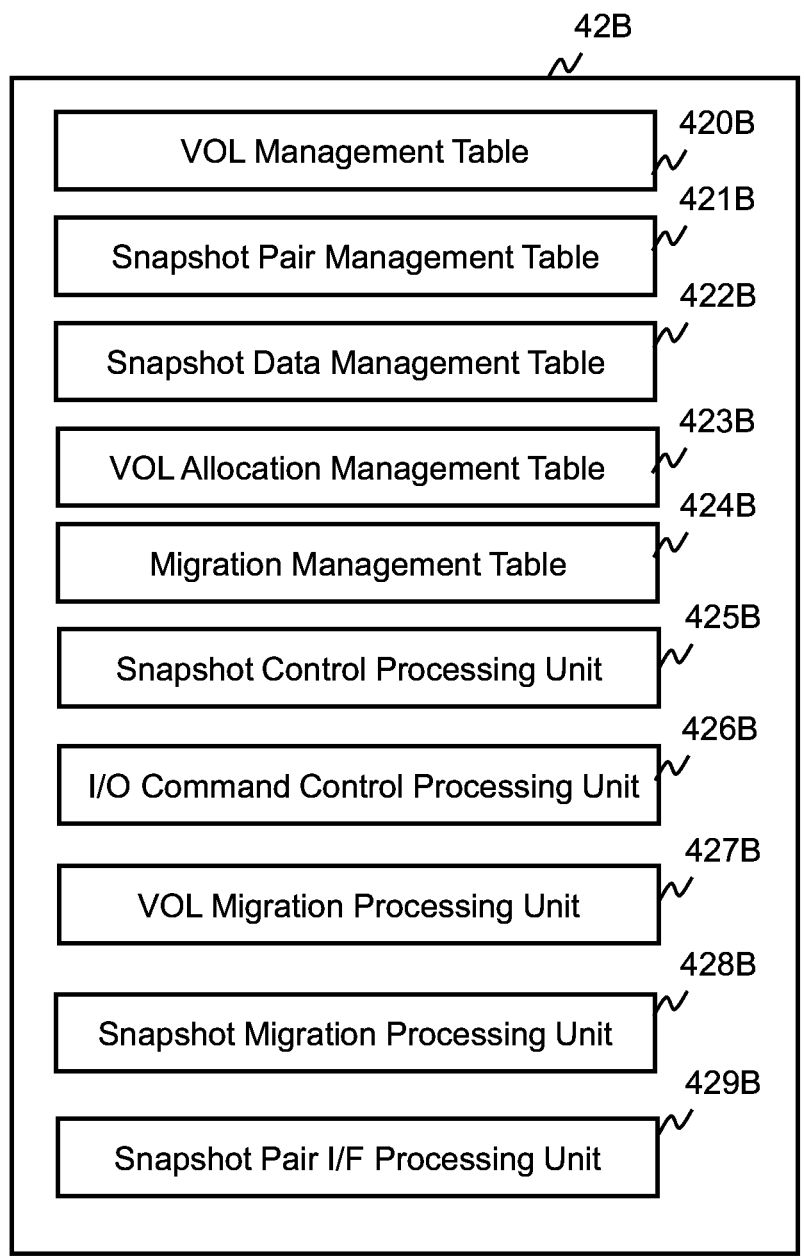
FIG. 3 is a conceptual diagram showing the function of a migration destination storage system.

FIG. 3 is a view showing the various control programs and the various management information tables of the migration destination storage system 4B. In the nonvolatile memory 42B of the migration destination storage system 4B is stored a VOL management table 420B, a snapshot pair management table 421B, a snapshot data management table 422B, a VOL allocation management table 423B, a migration management table 424B, a snapshot control unit 425B, an I/O command control processing unit 426B, a VOL migration processing unit 427B, a snapshot migration processing unit 428B and a snapshot pair I/F processing unit 429B.

Figure 4:
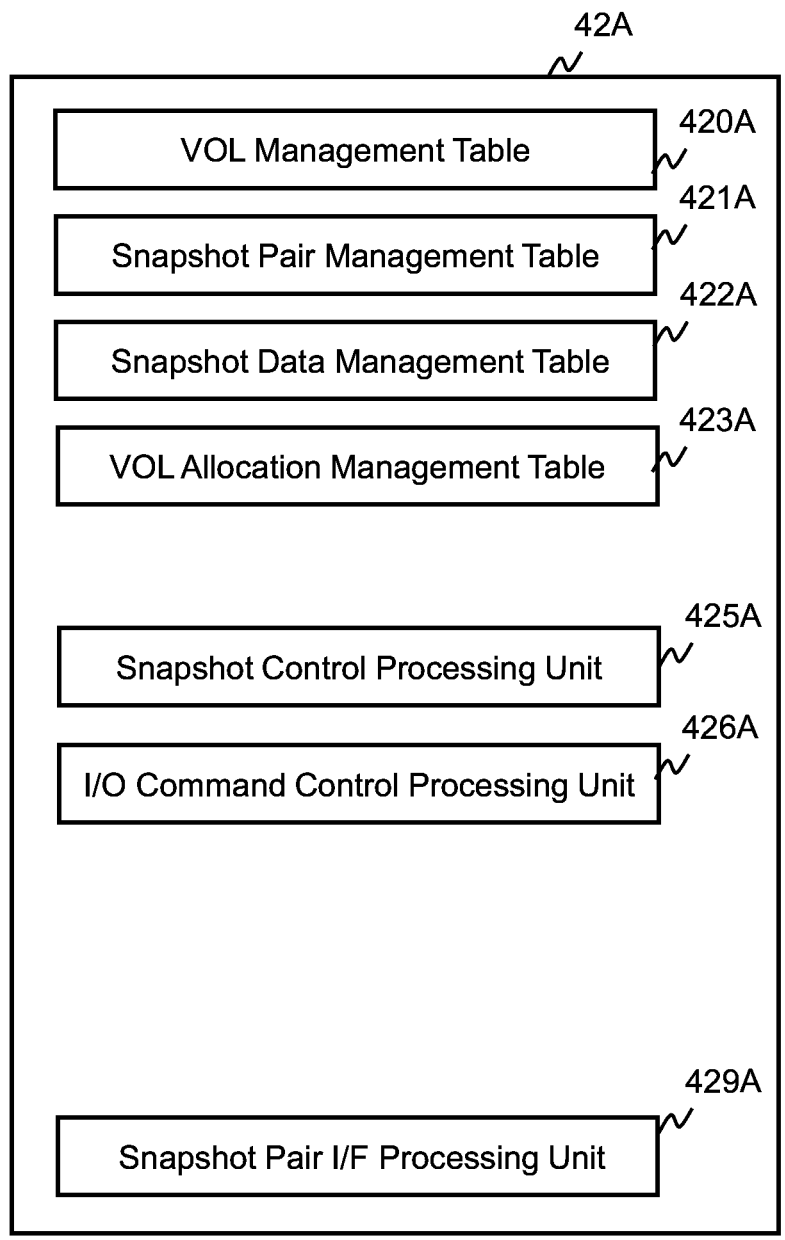
FIG. 4 is a conceptual diagram showing the function of a migration source storage system.

FIG. 4 is a view showing the various control programs and the various management information tables of the migration destination storage system 4A. In the nonvolatile memory 42A of the migration destination storage system 4A is stored a VOL management table 420A, a snapshot pair management table 421A, a snapshot data management table 422A, a VOL allocation management table 423A, a snapshot control processing unit 425A, an I/O command processing unit 426 and a snapshot pair I/F processing unit 429A.

Figure 5:
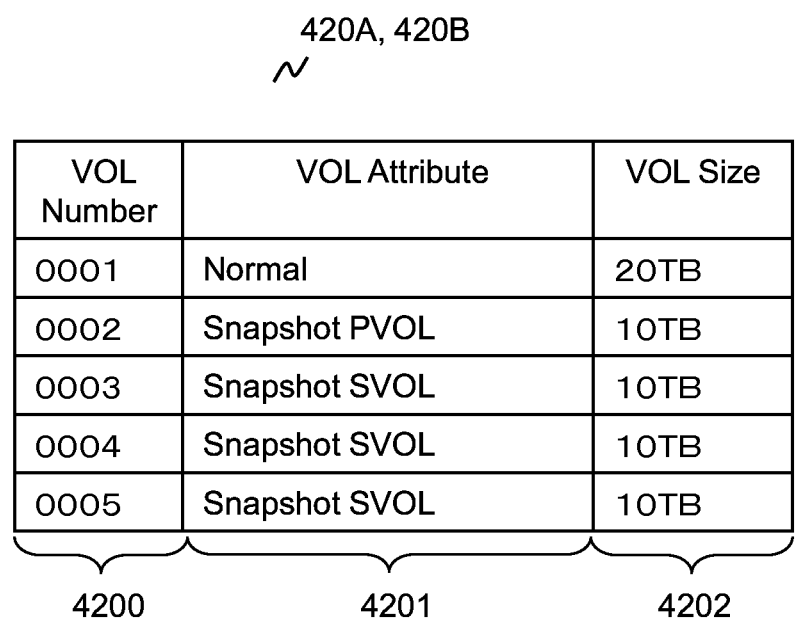
FIG. 5 is a conceptual diagram showing a data configuration of a VOL management table.

The VOL management tables 420A and 420B include information for managing the volumes within the migration source storage system 4A and the migration destination storage system 4B, and as actual information, as shown in FIG. 5, they store a VOL number 4200, a VOL attribute 4201 and a VOL size 4202.

In FIG. 5, the VOL number 4200 is a number for specifying volumes within the migration source storage system 4A and the migration destination storage system 4B. The VOL attribute 4201 shows whether each volume is a normal VOL, a snapshot PVOL or a snapshot SVOL. The VOL size 4202 shows the logical size of the VOL provided to the host computer 2 or the management computer 3.

Figure 6:
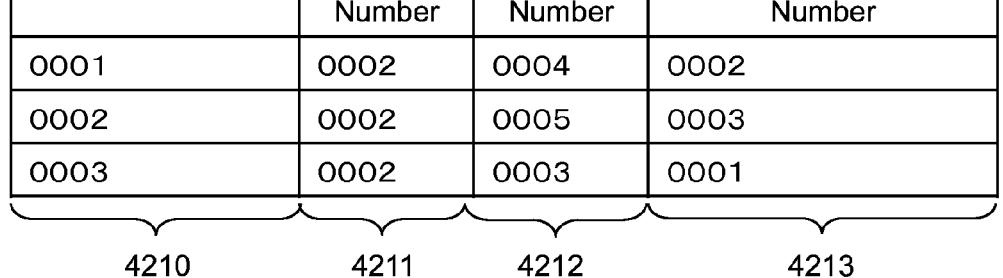
FIG. 6 is a conceptual diagram showing a data configuration of a snapshot pair management table.

The snapshot pair management tables 421A and 421B include information for managing the respective snapshot pairs within the migration source storage system 4A and the migration destination storage system 4B, and as actual information, as shown in FIG. 6, they store a snapshot number 4210, a PVOL number 4211, an SVOL number 4212 and a snapshot generation number 4213.

In FIG. 6, the snapshot number 4210 is the number for specifying the snapshot pair within the migration source storage system 4A and the migration destination storage system 4B. The PVOL number 4211 is a number for specifying the volume being the PVOL of that snapshot pair, which is a number determined based on the VOL number 4200 within the VOL management tables 420A and 420B. The SVOL number 4212 is a number for specifying the volume being the SVOL of that snapshot pair, which is a number determined based on the VOL number 4200 within the VOL management tables 420A and 420B. The snapshot generation number 4213 is a number for specifying the order in which the snapshots are created within the snapshot pairs having the same PVOL number 4211.

In the present description, smaller numbers show that the snapshot pair has been created earlier. The SVOL having a snapshot generation number 0001 is called a "first generation SVOL", and the SVOL having a snapshot generation number 0002 is called a "second generation SVOL". Hereafter, similarly, the SVOL having a snapshot generation number n is called an "n-th generation SVOL".

The snapshot data management tables 422A and 422B include information for managing whether each data of the SVOL of the snapshot has a difference data between other SVOLs or PVOLs, and as the actual information, as shown in FIG. 7, a PVOL number 4220, a slot number 4221 and difference information 4222 among SVOLs of various generations.

In FIG. 7, the PVOL number 4220 shows the same number as the number determined by 8 the PVOL number 4211 within the snapshot pair management tables 421A and 421B, for specifying the volume being the PVOL of the snapshot. The slot number 4221 is a number for specifying the logical address of each volume, wherein slot refers to a minimum unit for managing the data storage destination of the snapshot. The difference information 4222 among SVOLs of various generations shows whether an SVOL of a certain generation has a difference in the data stored in the same slot of a next generation SVOL. Actually, the row of the first generation SVOL shows the difference information between the first generation SVOL and the second generation SVOL, the row of the second generation SVOL shows the difference information between the second generation SVOL and the third generation SVOL, and the row of the n-th generation SVOL shows the difference information between the n-th generation SVOL and the n+1-th generation SVOL. However, when there is no row of the n+1-th generation SVOL, the row of the n-th generation SVOL shows the difference information between the n-th generation SVOL and the PVOL.

The VOL allocation management tables 423A and 423B include information showing which slot of each volume is allocated to which area of the pool, and as actual information, as shown in FIG. 8, a VOL number 4230, a slot number 4231, a presence of allocation 4232, a pool number 4232 and an in-pool slot number 4234 are stored therein.

In FIG. 8, the VOL number 4230 shows the same number as the number determined in the VOL number 4200 of the VOL management tables 420A and 420B. The slot number 4231 shows the same number as the number determined in the slot number 4221 of the snapshot data management tables 422A and 422B, for specifying the logical address of each volume. The presence of allocation 4232 shows whether each slot has an area allocated within the pool or not. If allocated, it shows that there is an area allocated within the pool, and if not allocated, it shows that there is no area allocated within the pool. The pool number 4233 is a number for specifying the pool having an area allocated regarding each slot. The in-POOL slot number 4234 shows a number for specifying the logical address within the pool allocated to each slot.

The migration management table 424B includes the information for managing the migration status of the VOL, and as actual information, as shown in FIG. 9, it stores a VOL number 4240, a migration status 4241, a VOL last slot number 4242 and a migration completion slot number 4243.

As shown in FIG. 9, the VOL number 4240 shows the same number as the number determined by the VOL number 4200 within the VOL management table 420B of the migration destination storage system 42B, to specify the volume within the migration destination storage system 42B. The migration status 4241 shows the status of migration of each volume. The term "complete" shows that migration to the migration destination storage system has been completed, the term "migrating" shows that the migration processing is performed currently, and the term "before migration" shows that migration has not yet started. The VOL last slot number 4242 shows the slot number of the terminal slot within the VOL. The migration completion slot number 4243 shows the slot from the leading slot within the respective VOLs that have completed migration. For example, if the value is 5000, it means that migration has been completed from the first slot to the 5000th slot, and that the slot to be migrated next is the 5001th slot.

The snapshot control processing units 425A and 425B are programs for performing an access data storage position specifying process for performing a reference process of the snapshot SVOL based on the information of the snapshot pair management tables 421A and 421B, the snapshot data management tables 422A and 422B, and the VOL allocation management tables 423A and 423B, and for performing a data copy necessity determining process and a copy process for performing update process of PVOL and SVOL.

The I/O command processing units 426A and 426B are programs for performing a read process and a write process according to the I/O processing request from the host computer 2.

The VOL migration processing unit 427B is a program for performing a volume migration process from migration source storage system 4A to migration destination storage system 4B based on the information of the migration management table 424B.

The snapshot migration processing unit 428B is a program for migrating the snapshot function by the instruction from the host computer 2 or the management computer 3.

The snapshot pair I/F processing units 429A and 429B are programs for referring to the information stored in the snapshot pair management tables 421A and 421B of the migration source storage systems 4A and 4B from the host computer 2, the management computer 3 or the migration destination storage system 4B.

<3. Snapshot Migration Process>

Figure 10:
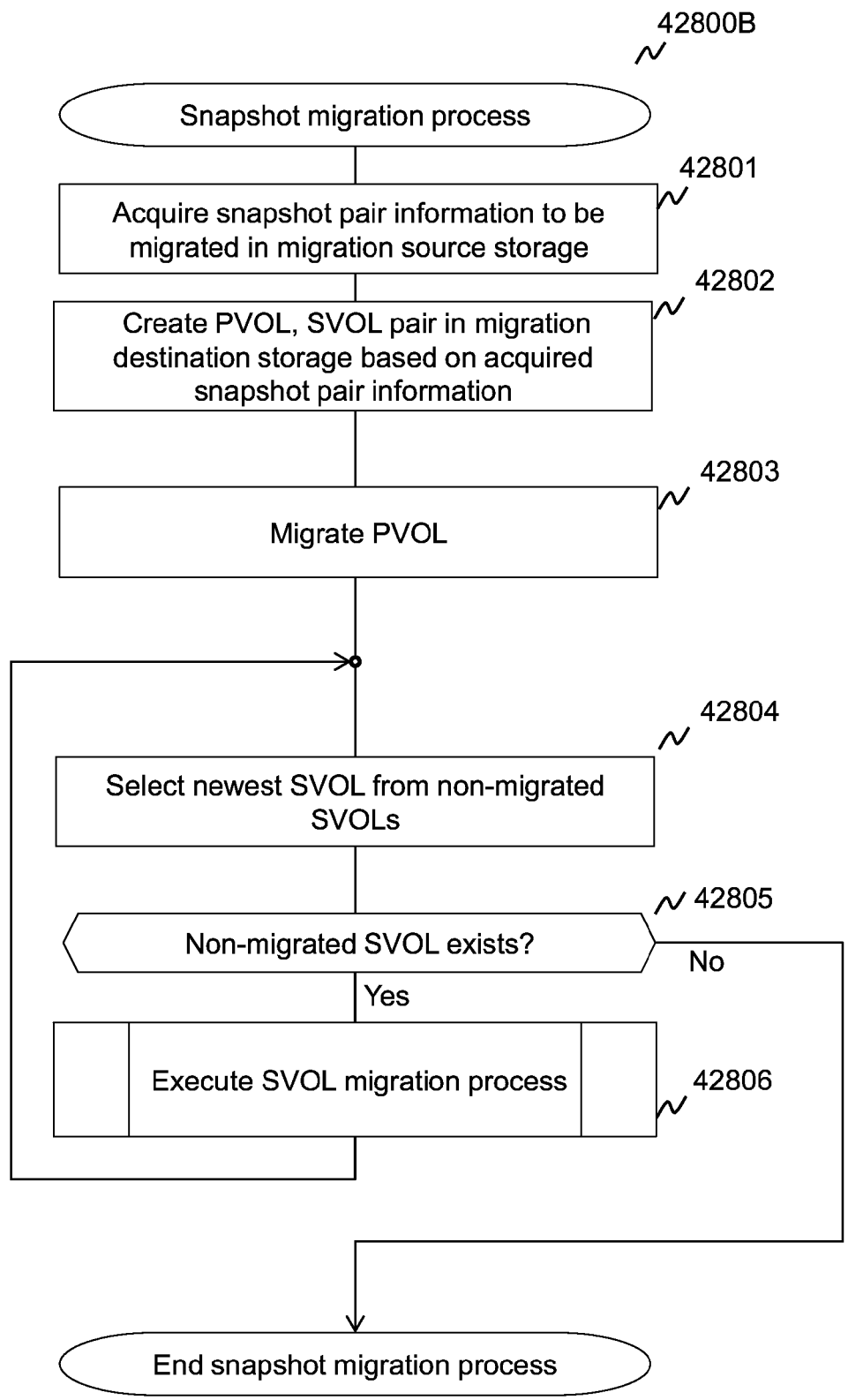
FIG. 10 is a flow diagram showing a snapshot migration process.

FIG. 10 shows the procedure of a snapshot migration process. The snapshot migration process is performed by selecting a snapshot pair to be migrated, or the PVOL or the SVOL from the management computer 3. Now, the respective steps of this procedure will be described sequentially.

In step 42801, the migration destination storage system 4B acquires the information of the snapshot pair to be migrated in the migration source storage system 4A. At this time, based on a the snapshot pair information output process 4290 (described in detail with reference to FIG. 14) by the snapshot pair I/F processing unit 429A stored in the nonvolatile memory 42A of the migration source storage system 4A, the migration source storage system 4A outputs necessary information for creating the snapshot pair management table 421B within the migration destination storage system 4B to the migration destination storage system 4B.

In step 42802, the migration destination storage system 4B creates a PVOL, SVOL pair based on the acquired snapshot pair information. That is, volumes corresponding to PVOL and SVOL are created within the migration destination storage system 4B, the VOL number 4200, the VOL attribute 4201 and the VOL size 4202 are set in the VOL management table 420B, the snapshot number 4210, the PVOL number 4211, the SVOL number 4212 and the snapshot generation number 4213 are set in the snapshot pair management table 421B, and the VOL number 4240, the migration status 4241, the VOL last slot number 4242 and the migration completion slot number 4243 are set in the migration management table 424B.

In step 42803, the PVOL is migrated. The process for migrating the PVOL is performed by copying data from the front end of the area of the volume sequentially from migration source storage system 4A to migration destination storage system 4B. At this time, the data copying process can be executed by reading data in the migration source storage system 4A by the migration destination storage system 4B, or can be executed by writing data from the migration source storage system 4A to the migration destination storage system 4B. The process can also be executed by the host computer 2 or the management computer 3. For example, it is possible to apply the art disclosed in United States Patent Application Publication 2012/0036330. Actually, the volume within the migration source storage system is mapped as an external volume of the migration destination storage system, and the inquiry information of the volume being migrated is set to the migration destination volume of the migration destination storage system. Then, by turning off the read/write cache with respect to the volume of the migration destination storage system, it becomes possible to migrate the migration target volume to a new storage system without requiring a special function in an existing storage system, and without stopping the transmission and reception of data between the host computer and the storage system.

The volume being migrated is managed via the migration management table 424B within the migration destination storage system 4B. The migration completion slot number 4243 is updated to correspond to the portion where copying of data is executed. After completing migration of the PVOL, the migration status 4241 corresponding to the VOL number 4240 of the migration completed PVOL within the migration management table 424B is set to "complete".

In step 42804, based on the data in the snapshot pair management table 421B and the migration management table 424B, the SVOL having the largest snapshot generation number (that is, the newest SVOL) is selected from the SVOLs being snapshot pairs with the PVOL migrated in the previous step.

In step 42805, it is determined whether a non-migrated SVOL exists or not. If non-migrated SVOL exists (Yes), the procedure advances to the SVOL migration process step 42806 (described later with reference to FIG. 11), and if non-migrated SVOL does not exist (No), the snapshot migration process is completed.

After the SVOL migration process 42806 is completed, the procedure returns to step 42804 again, and the present migration process is repeated until it is determined that there is no non-migrated SVOL in step 42805.

Figure 11:
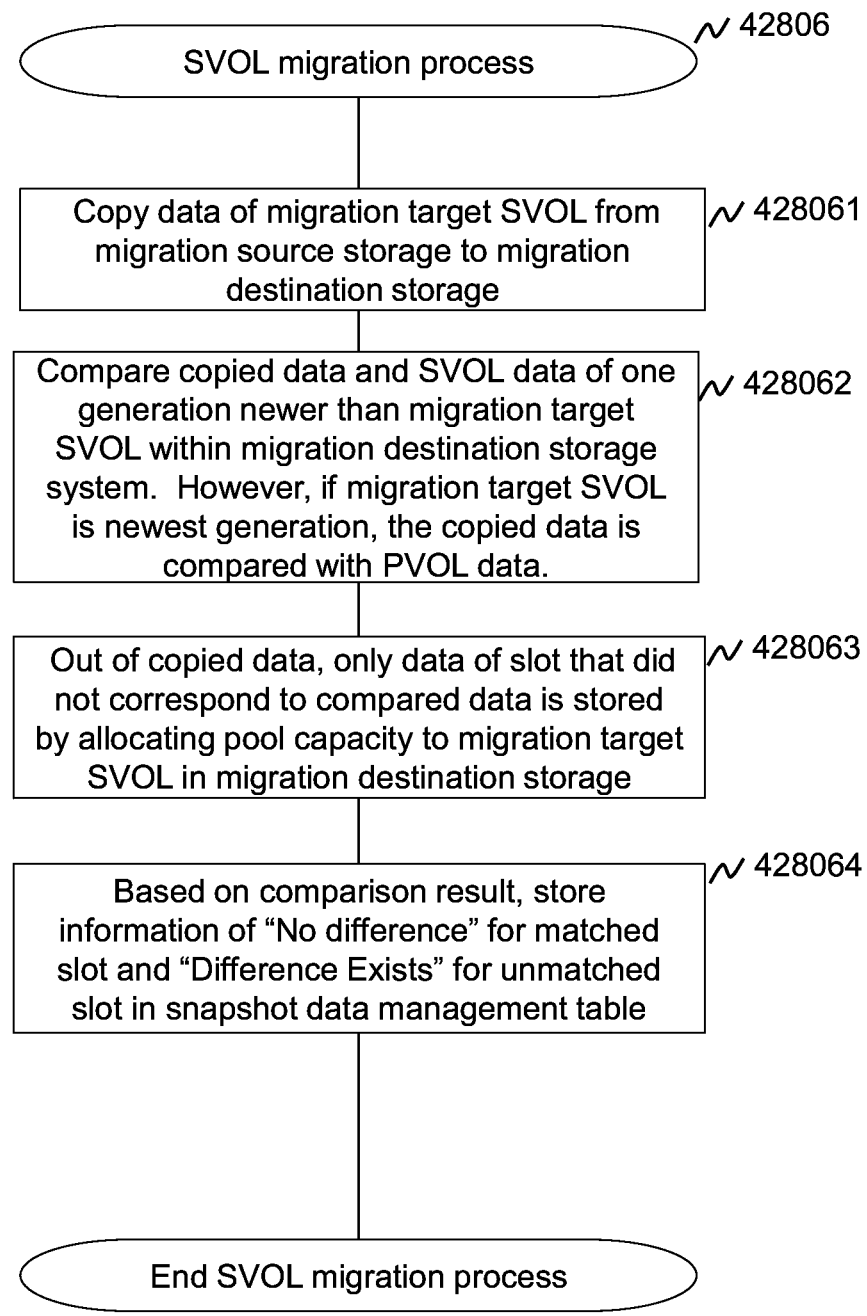
FIG. 11 is a flow diagram showing an SVOL migration process.

FIG. 11 shows the steps of the SVOL migration process according to step 42806 of FIG. 10 described earlier. Now, the respective steps of the process will be described sequentially in order.

In step 428061, the data 1500 of SVOL being the migration target is copied from the migration source storage system 4A to the migration destination storage system 4B. At this time, the data copying process can be executed by having the data in the migration source storage system 4A read by the migration destination storage system 4B, or by writing the data from the migration source storage system 4A to the migration destination storage system 4B. Further, the process can be executed by the host computer 2 or the management computer 3. Regarding the data in the snapshot SVOL within the migration source storage system 4A, the storage position of the data is specified via a SVOL data reference process (described later with reference to FIG. 12), and the data is transferred to the migration destination storage system 4B.

In step 428062, based on the information in the snapshot pair management table 421B, the PVOL number 4211 of the row including the migration target SVOL and the snapshot generation number 4213 are referred to, and out of the rows including the PVOL number having the same number as the reference PVOL number, a row including a snapshot generation number that is one greater than the reference snapshot generation number is searched, and the SVOL number 4212 of the found row is referred to. If no row including a one greater snapshot generation number is found, that is, if the snapshot generation number of the migration target SVOL was greatest, the PVOL number 4211 is referred to. Then, the data of the VOL having the reference VOL number is compared with the data copied from the migration source storage system 4A in step 428061. For example, in the example of FIG. 2A, the data "D", "B" and "E" of the volumes specified by the third generation SVOL 153B which are reference SVOL numbers are compared with "D", "B" and "C" of the migration target data 1500 copied from the migration source storage system 4A.

In step 428063, based on the result of comparison in the previous step, only the data of the slot where data did not correspond (only data "C" in FIG. 2A) is caused to have capacity allocated from the pool 160B to the migration destination SVOL (152B in FIG. 2B), to thereby store data. Now, the capacity allocation process is realized by entering the respective values in the VOL allocation management table 423B.

In step 428064, based on the result of comparison in step 428062, information stating that there is difference is entered to correspond to unmatched slots in the row of the corresponding PVOL number and slot number and the column of difference of the corresponding n-th generation SVOL, and information stating that there is no difference is entered to correspond to matched slots thereof.

If the processes from steps 428061 to 428064 have been completed for the data in all areas of the n-th generation SVOL being the migration target, the migration of the n-th generation SVOL is completed and the procedure returns to step 42804 of FIG. 10. Regarding the processes from steps 428061 to 424064, the processes can be performed sequentially to correspond to the pace of data copy from the migration source storage system 4A to the migration destination storage system 4B.

Figure 12:
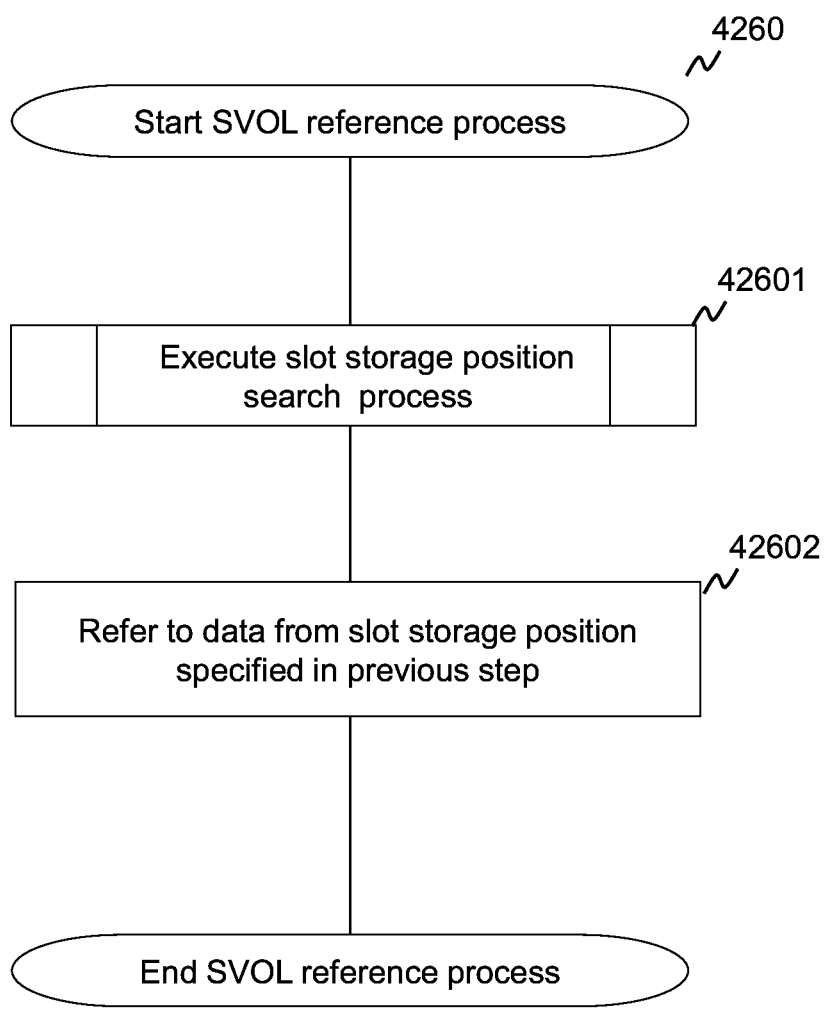
FIG. 12 is a flow diagram showing an SVOL reference process.

FIG. 12 illustrates the steps of a snapshot SVOL reference process. The process for referring to the snapshot SVOL is performed, for example, during I/O processing from the host computer 2, or during the migration process of SVOL data from the migration source storage system 4A to the migration destination storage system 4B. Now, the respective steps of the process will be described sequentially.

In step 42601, a storage position search process of a slot (described later with reference to FIG. 13) is executed.

In step 42602, data is referred to from the slot storage position specified in the previous step.

Figure 13:
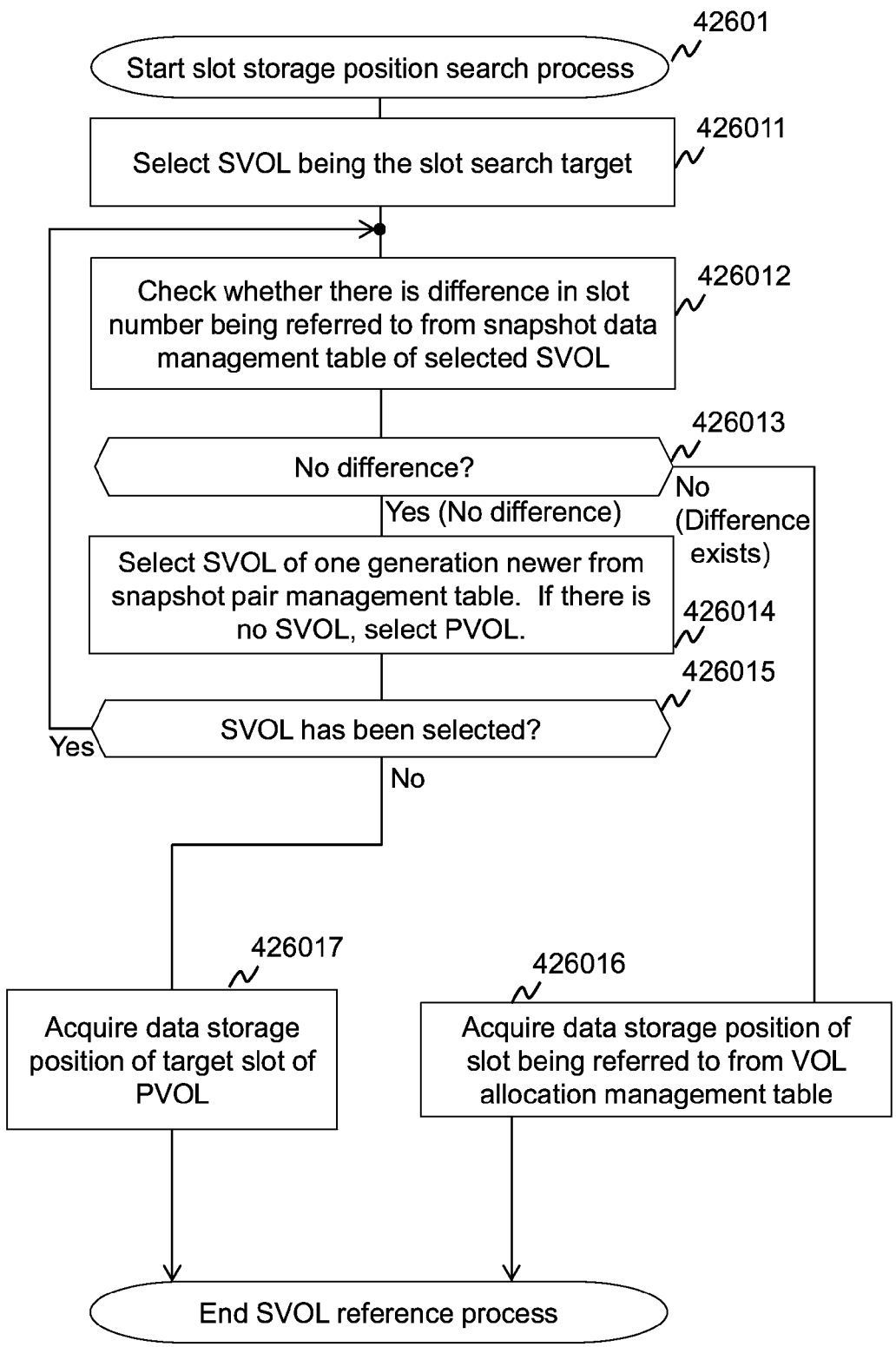
FIG. 13 is a flow diagram showing a slot storage position search process of snapshot data.

FIG. 13 is a flow diagram of the slot storage position search process of step 42061 of FIG. 12 described earlier. Now, the respective steps of the search process will be described sequentially.

In step 426011, the SVOL being the target of search of slot storage position is selected, and the VOL number of the SVOL is acquired from the VOL management tables 420A and 420B.

In step 426012, whether there is difference in the slot being the search target is referred to from the VOL number of the SVOL acquired in the previous step and the snapshot data management tables 422A and 422B.

In step 426013, whether there are differences or not is determined. If there is no difference (Yes), the procedure advances to step 426014. If there is difference (No), the procedure advances to step 426016.

In step 426014, based on the information in the snapshot pair management table 421B, the PVOL number 4211 of the row including the currently selected SVOL and the snapshot generation number 4213 are referred to, and a row including a one greater snapshot generation number than the reference snapshot generation number is searched from the rows including the PVOL number being the same number as the reference PVOL number, and the SVOL number of the found row is selected and the SVOL number is acquired. If a row including a one greater snapshot generation number is not found, that is, if the snapshot generation number of the currently selected SVOL is greatest, the PVOL is selected and the PVOL number is acquired.

In step 426015, whether the selected volume is an SVOL or not is determined. If the volume is an SVOL (Yes), the procedure returns to step 426012 and the processes are repeated. If the volume is not an SVOL (No), the procedure advances to step 426017.

In step 426016, based on the information in the VOL allocation management tables 423A and 423B, the pool number and the in-pool slot number in the row including the VOL number of the selected SVOL and the searched slot number are referred to, and the data storage position of the slot being searched is acquired.

In step 426017, the data storage position of the target slot of the selected PVOL is searched, and the data storage position of the slot is acquired.

Figure 14:
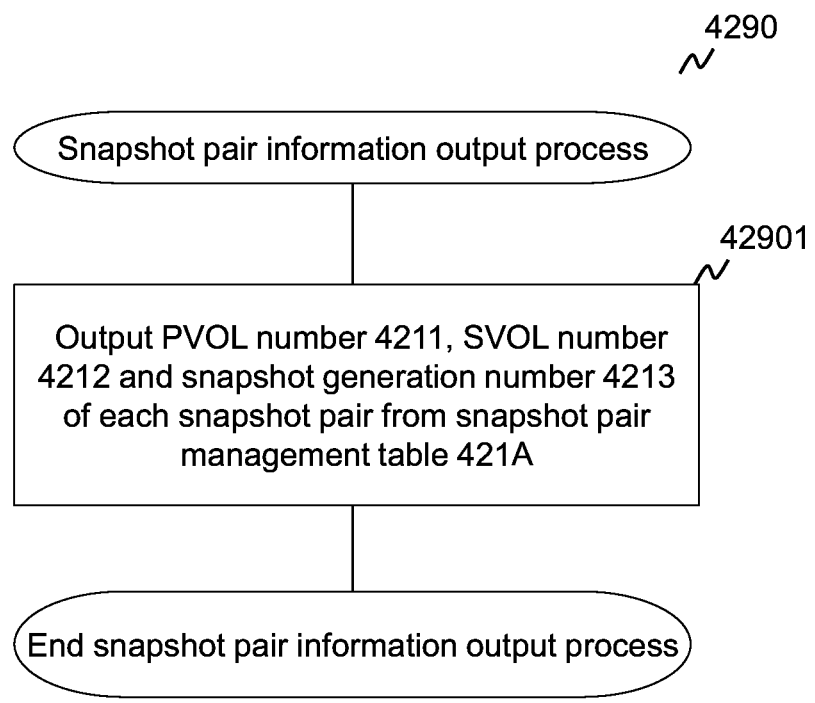
FIG. 14 is a flow diagram showing an output process of a snapshot pair information.

FIG. 14 is a flow diagram 4290 of a snapshot pair information output process. This is a process executed by the snapshot pair I/F processing unit 429A when a pair information reference request is sent from the management computer 3 or the migration destination storage system 4B to the migration source storage system 4A.

In step 42901, the PVOL number 4211, the SVOL number 4212 and the snapshot generation number 4213 of the snapshot pair are referred to from the migration source snapshot pair management table 421A, and the data is output to an external device sending the request.

The snapshot migration process described with reference to FIGS. 10 through 14 can also be realized by gathering the data of the PVOL and all the SVOLs forming snapshot pairs with the same PVOL in slot units, copying the same to the migration destination storage system 4B, compare the copied data within the migration destination storage system 4B, and setting the values in the snapshot data management table 422B and the VOL allocation management table 423B.

Figure 15:
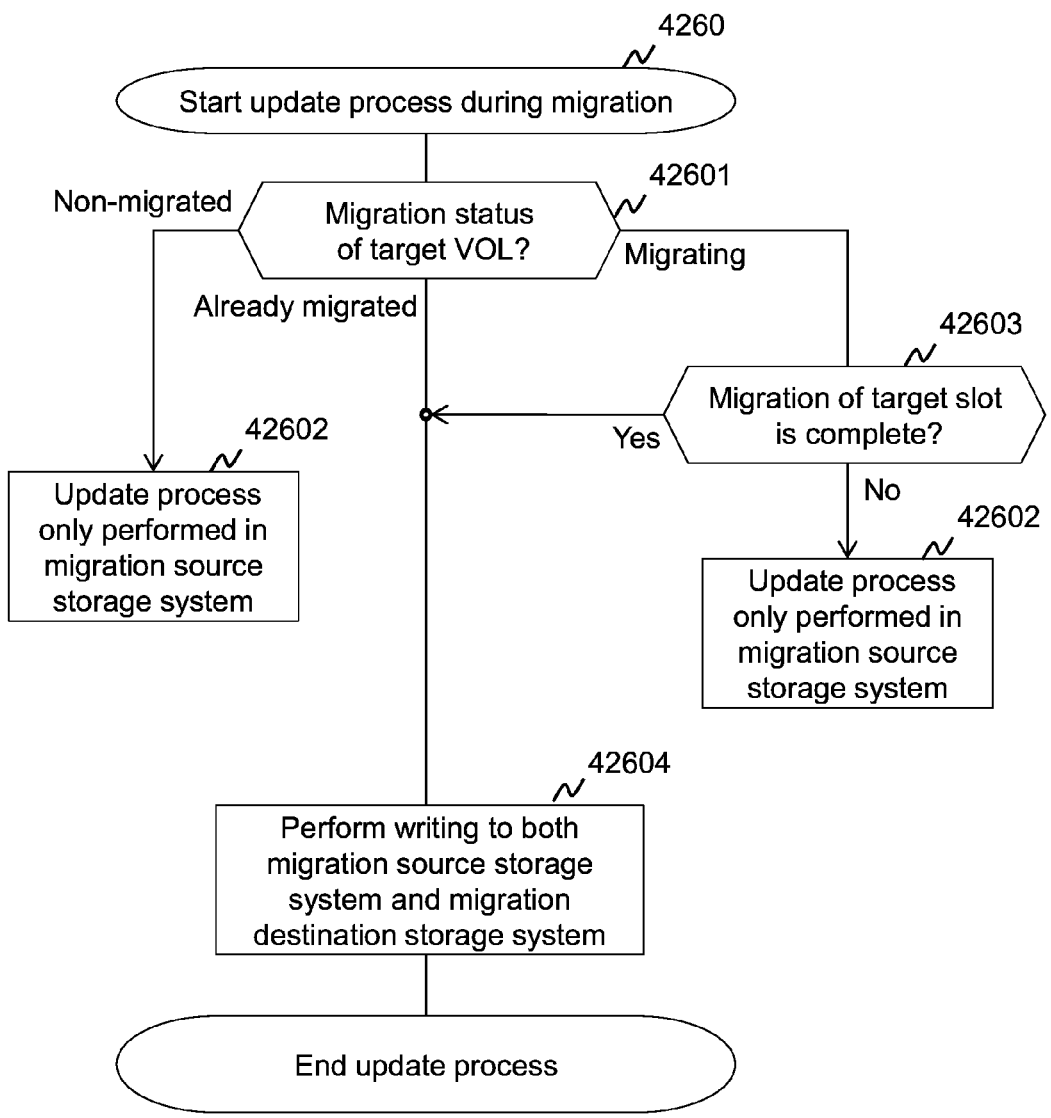
FIG. 15 is a flow diagram showing an update process of a migrating VOL.

FIG. 15 is a flow diagram 4260 of the update process of migration to the respective VOLs received within the migration destination storage system. Now, the respective steps of the update process will be described sequentially.

In step 42601, the procedure refers to the migration status 4241 in the migration management table 424B. As a result, if the status is "non-migrated", the procedure advances to step 42602, if the status is "migrating", the procedure advances to step 42603, and if the status is "already migrated", the procedure advances to step 42604.

In step 42602 (non-migrated), the update process will not be performed in the migration destination storage system 4B, and update process will only be performed in the migration source storage system 4A.

In step 42603 (migrating), the migration completion slot number 4243 is referred to further, and whether the update target slot has completed migration or not is determined. As a result, if migration has been completed (Yes), the procedure advances to step 4204, and if migration has not been completed (No), the procedure advances to step 42602.

In step 42604 (already migrated), the VOL data of both the migration destination storage system 4B and the migration source storage system 4A are updated.

According to the above process, even when failure occurs during migration of VOLs, it is possible to constantly maintain a state where data can be restored from the migration source storage system 4A.

Embodiment 2

Embodiment 2 of the present invention describes a case of managing the data of each slot so that only the difference data with respect to the PVOL data is managed for the data of the SVOL of each generation of snapshots within the migration destination storage system.

Figure 16A:
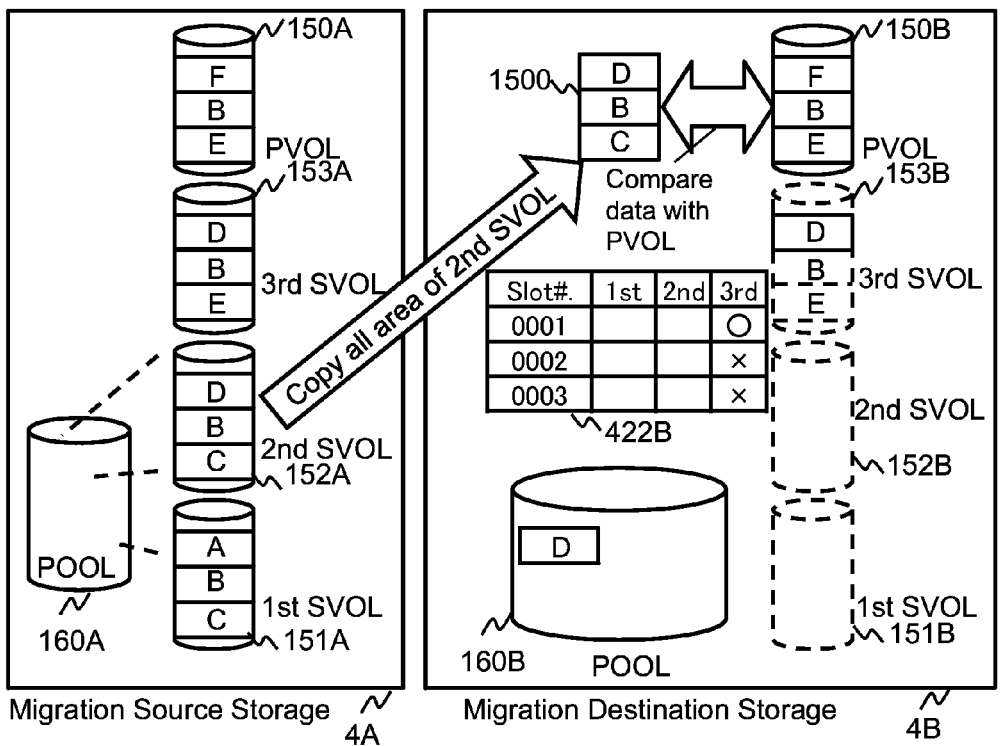
FIG. 16A is a block diagram showing a former half of migration operation according to the outline of embodiment 2.
Figure 16B:
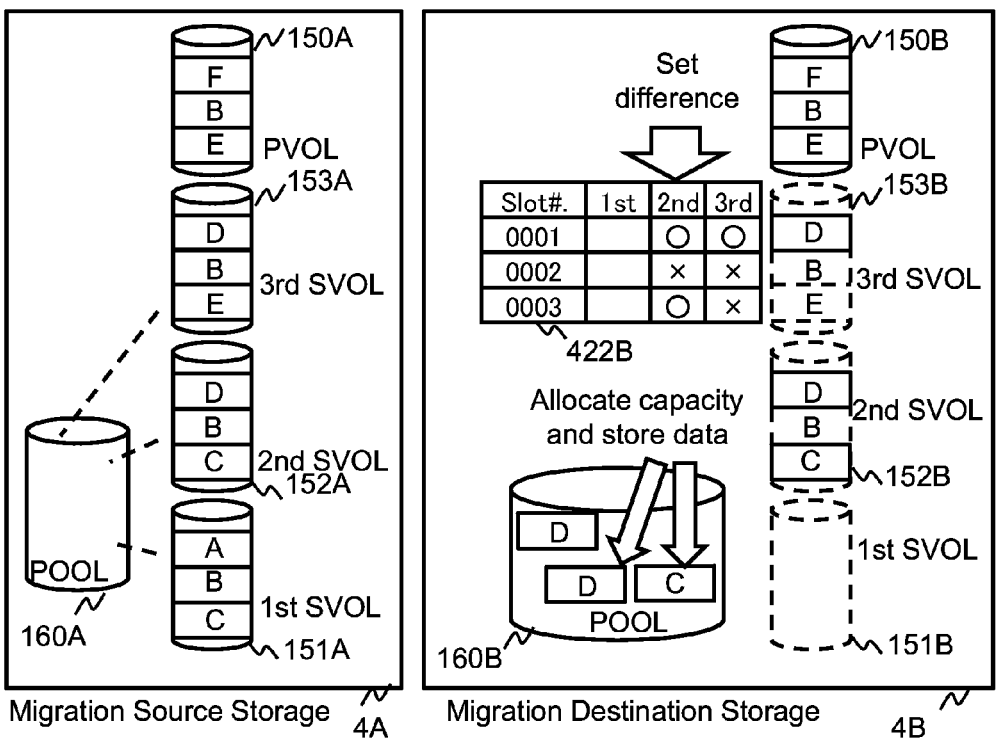
FIG. 16B is a block diagram showing a latter half of migration operation according to the outline of embodiment 2.

FIGS. 16A and 16B show outlines of embodiment 2 according to the present invention.

A PVOL 150A of a snapshot which is the migration target, a first generation SVOL 151A, a second generation SVOL 152A, a third generation SVOL 153A and a pool 160A storing the data of these volumes are stored in the migration source storage system 4A.

Each PVOL being the migration target, a PVOL 150B corresponding to the SVOL, a first generation SVOL 151B, a second generation SVOL 152B, a third generation SVOL 153B, a pool 160B storing the data of these volumes, an SVOL data 1500 copied from the migration source storage system 4A to the migration destination storage system 4B, and a snapshot data management table 422B are stored in the migration destination storage system 40B.

In the respective SVOLs, the first generation SVOLs 151A and 151B are oldest, the second generation SVOLs 152A and 152B are newer, and the third generation SVOLs 153A and 153B are newest. The PVOL and the respective SVOLs can receive I/O from the host.

FIG. 16A illustrates a former half of the operation for migrating the second generation SVOL 152A from the migration source storage system 4A to the migration destination storage system 4B. At first, the data of all areas of the second generation SVOL in the migration source storage system 4A is copied to the migration destination storage system 4B. Next, the currently copied data 1500 is compared with the data of PVOL 150B within the migration destination storage system 4B to check if there are differences.

FIG. 16B illustrates a latter half of the operation for migrating the second generation SVOL 152A from the migration source storage system 4A to the second generation SVOL 152B of the migration destination storage system 4B. Based on the result of checking for any differences, whether there are any differences in each slot are entered in the snapshot data management table 422B. Regarding the slot determined to have difference, the necessary capacity is allocated from the pool 160B to the second generation SVOL 152B, and the data of the corresponding slot of data 1500 copied from the migration source storage system 4A is stored therein.

In the present embodiment 2, the difference information 4222 of the SVOL of each generation in the snapshot data management table 422B shows the information on whether there are differences between the SVOL of each generation and the PVOL in slot units.

Further, the present embodiment 2 does not depend on the data structure of the tables related to the snapshot function within the migration source storage system 4A or the method for realizing the snapshot function.

According to the present embodiment 2, the processes of the respective flows are changed as described below. In step 428062 of FIG. 11, the copied data is compared with the PVOL data, regardless of the generation of the migration target SVOL. In step 426014 of FIG. 13, PVOL is selected regardless of the generation of the SVOL selected.

The present embodiment 2 exerts the following effects based on the differences from embodiment 1.

In embodiment 1, if two or more generations of SVOLs exist, and if there are no differences between generations of a certain slot, it is necessary to refer two or more times to the snapshot data management table 422B to refer to the data of the first generation SVOL. If there are more generations, the number of times of reference to the snapshot data management table 422B is also increased, so that the access performance differs among generations of SVOLs. In contrast, according to embodiment 2, the SVOL generations do not adopt a hierarchical relationship, the snapshot data management table 422B is only referred to once regardless of the generation or location of data of the SVOL, so that there are no differences between the access performances among SVOLs. The present data management method of the snapshot function is suitable for using the SVOLs of the snapshot as a necessary volume for starting a plurality of the same virtual machines at the same time speedily. On the other hand, since according to the present embodiment 2, the data prior to update is copied for the SVOLs of all generations, embodiment 1 is considered superior from the viewpoint of capacity efficiency.

Embodiment 3

The third embodiment of the present invention describes an example of the method for realizing a snapshot function in a migration destination storage system 4B, assuming that if there are SVOLs of three generations or more, there are differences between slots of SVOLs of the in-between generations, and data is shared among the pervious or latter SVOLs or with the PVOL.

Data sharing in the present embodiment 3 can be realized, for example, via a method for managing the generation of the SVOL sharing data therewith in the difference column of each generation SVOL in the snapshot data management table 422B.

FIG. 17 shows the snapshot data management table 422B according to embodiment 3. A data share information 4222 of the SVOL of the respective generations show the information on which generation SVOL or PVOL each slot of the SVOL of each generation shares data with.

During migration of the SVOL, the data 1500 copied from the migration source storage system 4A to the migration destination storage system 4B is compared with the data of the PVOL and all SVOLs having been migrated from the SVOLs having the same PVOL as the snapshot pair as the migration target SVOL within the migration destination storage system 4B.

Based on the result of comparison, it is entered in the snapshot data management table 422B that the migration target shares the data with the SVOL of the newest generation from all the SVOLs having corresponding data. If the data corresponds to the data of the PVOL, it is entered in the table that it shares data with the PVOL. If there is no corresponding data, it is entered in the table that data is not shared.

The present embodiment 3 exerts the following effects based on the differences with embodiments 1 and 2.

Embodiment 1 manages the difference information of SVOL data of a certain generation and the SVOL data of the next generation. Therefore, if there is no difference between the data in the same slot of the SVOL of generation n and the SVOL of generation n–2, and there is difference only between the data in the same slot of the SVOL of generation n–1 N+1, the slot of the SVOL of generation n and the slot of SVOL of generation n–2 has different areas allocated within the pool.

In contrast, according to embodiment 3, there is only one area allocated in the pool to the slot of the SVOL of generation n and the slot of the SVOL of generation n–2, so that it has better capacity efficiency compared to embodiment 1. The present data management method of the snapshot function is preferable when the capacity used for the snapshot should be reduced as much as possible. However, since there is a need to determine whether there is any corresponding data among all generation SVOLs according to embodiment 3, the process overhead of the CPU regarding the snapshot migration process is increased compared to embodiments 1 and 2.

The embodiments 1 through 3 according to the present invention provides methods for realizing snapshots within the migration destination storage system 4B, wherein data is managed having the PVOL or the SVOL of the generation closer to PVOL mainly managing data, and the SVOL of older generations have only difference data with the PVOL or newer generation SVOL managed in the pool. However, it is also possible to have data managed mainly by the SVOL of the oldest generation, and to have only difference data of the PVOL or the SVOLs of newer generations with the older generation SVOL managed in the pool. Such an example can be realized by reversing the migration procedure. Actually, in step 42803 of FIG. 10, the oldest generation SVOL is migrated, and in step 42804, the SVOL of the oldest generation is selected from the non-migrated SVOLs. In step 42805, if it is determined that there is no non-migrated SVOL, the PVOL is migrated lastly to end the snapshot migration process. In step 428062 of FIG. 11, the data is compared with the data of the SVOL of a generation one generation older than the migration target SVOL. In step 426014 of FIG. 13, a one-generation-older SVOL is selected from the snapshot management table. In step 426015, determination is made on whether a SVOL other than the oldest generation SVOL has been selected. In step 426017, the data storage position of the target slot of the oldest generation SVOL is searched, and the data storage position of the target slot is acquired.

In FIG. 7, according to embodiment 1, the column of the n-th generation SVOL shows the difference information between the n-th generation SVOL of the n-th generation SVOL. According to embodiment 2, the column of the n-th generation SVOL shows the data of the n-th generation SVOL and the first generation SVOL.

According to embodiment 3, the column of the n-th generation SVOL in the snapshot data management table 422B shows that data is shared with the oldest generation SVOL out of the corresponding data.

Further, the present embodiments 1 through 3 do not depend on the data structure of the tables regarding the snapshot function within the migration source storage system 4A, or the method for realizing the snapshot function.

The effects similar to embodiments 1 and 2 can be achieved by the configuration of embodiment 3.

REFERENCE SIGNS LIST

2 Host computer
3 Management computer
4A Migration source storage system
4B Migration destination storage system
5 SAN
6 LAN
10, 20, 40A, 40B CPU
11, 21, 41A, 41B Memory
12, 22, 30A, 30B Storage device
13, 23, 46A, 46B Interface control unit
14, 44A, 44B, 45A, 45B Port
31A, 31B Control unit
42A, 42B Nonvolatile memory
43A, 43B Cache memory

The invention claimed is:

1. A storage system coupled to another storage system and managing both current data and data of a certain point of time in the past for n generations (n being an integer of greater than 1), the storage system comprising:
   a controller; and
   at least one storage device; wherein
   the controller is configured to
   acquire, from the other storage system, at least a data of generation n of a certain point of time and a data of generation n–1 at a point of time further in the past than generation n;
   compare the data of generation n and the data of generation n–1;
   determine, based on the comparison, whether there is any difference data between the data of generation n and the data of generation n–1; and
   generate a difference information of data of generation n–1 with respect to generation n based on the determination result, and store the generated difference information in the at least one storage device;

wherein the controller is configured to acquire, from a secondary volume (SVOL) of the other storage system, data of generations at different points of time and to determine difference data between the data of generations; and wherein the controller is configured to acquire, from the secondary volume (SVOL) of the other storage system, one of (i) data of generations at different points of time sequentially starting from a newest generation or (ii) all data of generations at different points of time regardless of any difference management information stored in the other storage system.

2. The storage system according to claim 1, wherein the controller is further configured, after determining whether there is any difference data between the data of generation n and the data of generation n−1, to:

compare the data of generation n−1 and the data of generation n−2 at a point of time further in the past compared to generation n−1 (n being an integer of 3 or greater) acquired from the other storage system;

determine, based on the comparison, whether there is any difference data between the data of generation n−1 and the data of generation n−2; and generate a difference information of data of generation n−2 with respect to generation n−1 based on the determination result, and store the generated difference information in the at least one storage device.

3. The storage system according to claim 1, wherein the controller is configured to acquire data of a current state as data of generation n+1 which is newer than generation n.

4. The storage system according to claim 1, wherein the data of generation n (n being an integer of 3 or greater) is the data of a current state; and the controller is further configured to:

acquire a data of generation n−2 of a point of time further in the past than generation n−1;

compare the data of generation n and the data of generation n−2;

determine, based on the comparison, whether there is any difference data between the data of generation n and the data of generation n−2; and generate a difference information of data of generation n−2 with respect to generation n based on the determination result, and store the generated difference information in the at least one storage device.

5. The storage system according to claim 1, wherein the controller is further configured to:

provide a pool area in a storage area provided by the at least one storage device;

regarding the data of generation n−1, refer to the acquired data of generation n as for the same data as generation n; and as for the data that differs from generation n, perform management so as to store the data in the pool area based on the difference information, and refer to the stored data.

6. The storage system according to claim 5, wherein the controller is further configured to:

during acquisition of data from the other storage system, if an update request regarding the data being the target of acquisition is received, execute data update based on the update request regarding the already acquired data; and not execute the data update based on the update request regarding non-migrated data.

7. A storage system coupled to another storage system and managing both current data and data of a certain point of time in the past for n generations (n being an integer of greater than 2), the storage system comprising:

a controller; and at least one storage device; wherein the controller is configured to acquire, from the other storage system, current information data which is a data of generation n, data of generation n−1 at a point of time further in the past than generation n, and data of generation n−m at a point of time further in the past than generation n−1 (m being an integer of 2 or more, and n>m);

compare the data of generation n to generation n−m and the data of generation n−m+1; and determine, based on the comparison, whether there is any data from generation n to generation n−m that corresponds to the data of generation n−m+1 or newer, and if there is data that corresponds, then generate information showing that data is shared with the data of the generation closest to n from the data that corresponds, and store the generated information in the at least one storage device;

wherein the controller is configured to acquire, from a secondary volume (SVOL) of the other storage system, data of generations at different points of time and to determine difference data between the data of generations; and wherein the controller is configured to acquire, from the secondary volume (SVOL) of the other storage system, one of (i) data of generations at different points of time sequentially starting from a newest generation or (ii) all data of generations at different points of time regardless of any difference management information stored in the other storage system.

8. A data migration method for migrating data from a first storage system managing current data and data of a certain point of time in the past for n generations (n being an integer of greater than 1) to a second storage system, the method comprising:

acquiring, by the second storage system, a data of generation n of a certain point of time from the first storage system;

acquiring, by the second storage system, a data of generation n−1 at a point of time further in the past than generation n from the first storage system, comparing the data of generation n and the data of generation n−1, and determining, based on the comparison, whether there is any difference data between the data of generation n and the data of generation n−1; and generating, by the second storage system, a difference information of data of generation n−1 with respect to generation n if there is difference data based on the determination result, and storing the generated difference information;

wherein the second storage system acquires, from a secondary volume (SVOL) of the first storage system, data of generations at different points of time and to determine difference data between the data of generations; and wherein the second storage system acquires, from the secondary volume (SVOL) of the first storage system, (i) data of generations at different points of time sequentially starting from a newest generation or (ii) all data of generations at different points of time regardless of any difference management information stored in the first storage system.

9. The data migration method according to claim 8, further comprising:

after determining, by the second storage system, whether there is any difference data between the data of generation n and the data of generation n−1, comparing, by the second storage system, the data of generation n−1 and the data of generation n−2 at a point of time further in the past compared to generation n−1 (n being an integer of 3 or greater) acquired from the first storage system;

determining, by the second storage system based on the comparison, whether there is any difference data between the data of generation n−1 and the data of generation n−2; and generating, by the second storage system, a difference information of data of generation n−2 with respect to generation n−1 if there is difference data, and storing the generated difference information.

10. The data migration method according to claim 8, further comprising:

acquiring, by the second storage system, data of a current state as a data of generation n+1 newer than generation n.

11. The data migration method according to claim 8, wherein the data of generation n (n being an integer of 3 or greater) is set as the data of a current state; the method further comprising:

acquiring, by the second storage system, from the first storage system a data of generation n−2 of a point of time further in the past than generation n−1;

comparing, by the second storage system, the data of generation n and the data of generation n−2;

determining, by the second storage system based on the comparison, whether there is any difference data between the data of generation n and the data of generation n−2; and generating, by the second storage system, a difference information of data of generation n−2 with respect to generation n if there is difference data, and storing the generated difference information.

12. The data migration method according to claim 8, further comprising:

storing, by the second storage system, data from the data of generation n−1 that differs from the data of generation n based on the difference information in a pool area provided in a storage device of the second storage system.

13. The data migration method according to claim 12, further comprising:

during acquisition of data from the first storage system, if an update request regarding the data being the target of acquisition is received by the second storage system, only executing data update based on the update request regarding the already migrated data and not executing data update regarding non-migrated data.

* * * * *